Feb. 20, 1923.

J. J. GARDNER.
MOTOR VEHICLE.
FILED NOV. 17, 1921.

1,445,677.

INVENTOR,
John J. Gardner,
BY
Rogers, Kennedy & Campbell,
ATTORNEYS.

Patented Feb. 20, 1923.                                                            1,445,677

UNITED STATES PATENT OFFICE.

JOHN J. GARDNER, OF NEW YORK, N. Y.

MOTOR VEHICLE.

Application filed November 17, 1921. Serial No. 515,916.

*To all whom it may concern:*

Be it known that I, JOHN J. GARDNER, a citizen of the Swiss Republic, residing at New York city, in the county of New York and State of New York, have invented certain new and useful Improvements in Motor Vehicles, of which the following is a specification, reference being had therein to the accompanying drawing.

This invention is a novel motor vehicle and comprises features of improvement adaptable to various motor vehicles, especially pleasure and other motor vehicles of light construction. The general object of the present invention is to afford a motor vehicle of the kind referred to of improved construction and operation, and greater safety, and ease of handling, with less weight and at lower cost than known motor vehicles of the same utility. Another object is to afford a motor vehicle with improved resilient suspension involving novel features in the arrangement of the frames and springs. Another object of the invention is to afford a motor vehicle having front wheel drive, preferably with the steering by the rear wheel or wheels. Another object is to afford a three-wheeled motor vehicle of practical utility, having two front wheels and a single rear wheel. Other objects and advantages will be hereinafter described or will be apparent to those skilled in the art.

To the attainment of the above referred to objects and advantages the present invention consists in the novel motor vehicle, and the novel features of arrangement, combination, construction and detail herein shown or described.

In the accompanying drawings showing a convenient embodiment of the principles of the present invention. Fig. 1 is a side elevation of a motor vehicle. with the engine, drive connections and various other parts omitted for the sake of clearness of illustration.

Figure 1:
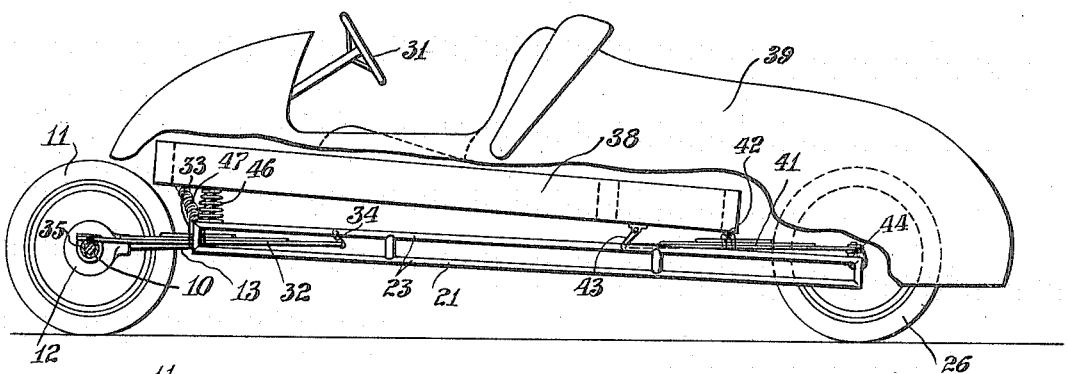

The drawing, although somewhat diagrammatic in some respects, sufficiently illustrates the principles of the present improvement to enable those skilled in the art to practice the same.

The front axle 10 may be analogous to the usual rear axle of motor vehicles. It carries the front wheels 11 at its extremities and at the center is provided with a differential gear 12 connected with the longitudinal drive shaft 13. A universal joint 14 is provided as usual between the drive shaft and the motor. 15 represents a brake drum between the universal coupling 14 and the clutch 16. Between the brake drum and the clutch is indicated the usual speed change gear 17. These elements 15—17 and the engine 18 with its flywheel 19 are mounted upon the upper frame 38, hereafter to be described.

The construction of the vehicle is shown as comprising the under frame 21 and the afore mentioned upper frame 38, the former supported upon the wheels and the latter supporting the vehicle body, engine, etc., the two frames being resiliently interconnected.

Figure 2:
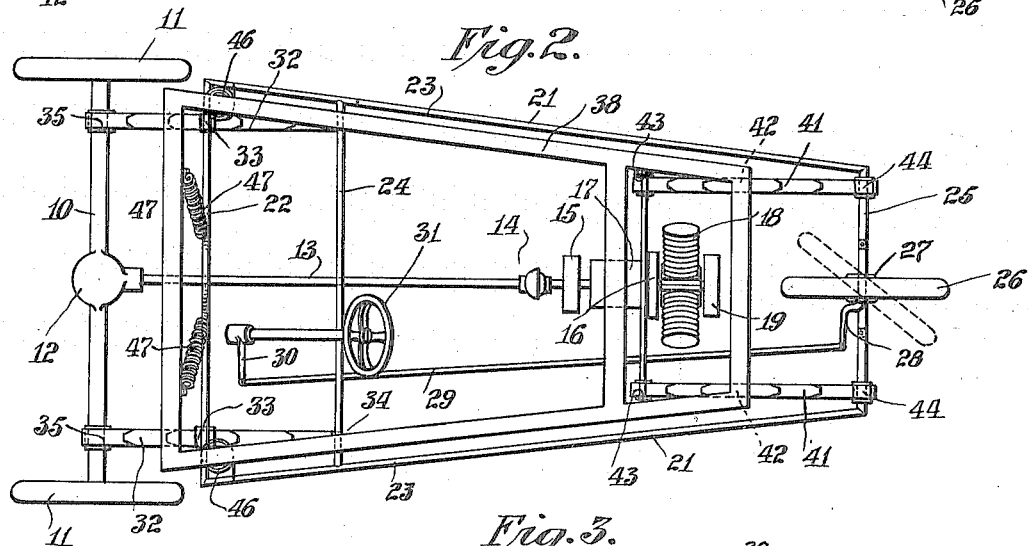
Fig. 2 is a top plan view of the motor vehicle shown in Fig. 1, with the body of the car omitted.
Figure 3:
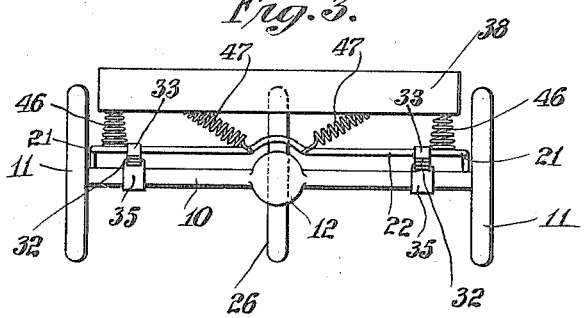
Fig. 3 is a front elevation of the parts shown in Fig. 2.

The lower frame 21 may consist of steel tubing rigidly united in the form shown, and having a front bar 22, side bars 23 and a cross bar 24 forward of the middle of the frame. The rear ends of the side bars 23 are spanned by the cross member 25 which, although preferably rigid, is shown as constituting the axle or mounting of the rear wheel 26. The rear wheel may be mounted on its axle by means of a ball bearing gimbal joint eccentrically located at 27 so that the wheel can be swung from the full line position of Fig. 2 to the dotted position, and vice versa, for steering purposes. Steering connections 28, 29 and 30 between the rear wheel and the steering wheel 31 are indicated. The rear axle is shown as having its middle part detachable for the purpose of permitting assemblage of the described parts.

The lower frame 21, although thus directly supported upon the rear axle, is resiliently supported upon the front axle. For this purpose longitudinal springs 32 are employed, preferably arranged in the manner shown. By longitudinal springs I refer to elongated horizontal springs of any known type such as those indicated. Each of the longitudinal springs 32 receives front support upon the front axle 10 and middle and rear connection to the lower frame 21. Thus a bushing 33 is shown connecting the middle of each spring 32 to the front member 22 of the lower frame. Also a shackle or link 34 is shown connecting or suspending the rear end of the spring 32 from the cross bar 24 of the lower frame. Also a shackle 35 is shown connecting the spring 32 with the front axle 10.

The upper frame 38 may be constructed of channel steel or sometimes of wood and may be substantially of the form indicated. This frame gives support to the engine and associated parts and also carries the body 39 having a driver's seat to the rear of the steering wheel 31.

I preferably support the upper upon the lower frame in the following resilient manner. A longitudinal spring 41 is shown, or rather a pair of these springs, at the rear ends of the frames. Each of the rear springs 41 receives rear support upon the under frame or rear axle. Each of these springs has front connection with the upper frame. Each of these springs at its middle is connected with one or the other of the frames, preferably the upper frame. A bushing 42 is shown connecting the middle of each longitudinal spring 41 with the upper frame. A link or shackle 43 is shown connecting the front of each spring 41 with the upper frame. Each spring 41 is shown as supported by a shackle 44 upon the under frame or the rear axle constituting part thereof.

It only remains to describe the connection between the front ends of the frames, which is preferably resilient. For this purpose compression springs 46 are shown, located directly between the lower and upper frames at the front. These, for example, may be in the form of stout coil springs. In order to minimize lateral sway of the upper frame while preserving its resilient suspension, at the front end, a pair of oppositely inclined tension springs 47 may be provided, in the manner shown or otherwise.

The various described features of improvement herein are found to effectively cooperate. The particular combination and arrangement of the front and rear wheels, the under and upper frames and the suspension springs is found to give a most advantageous vehicle with great resilience yet simplicity of structure and durability.

Some of the described features and details however could be dispensed with without departing from the principles involved; and it is not intended to limit the invention to the entire combination, nor to the several features of arrangement, construction and detail, except in so far as the same are specified in the appended claims.

What is claimed is:

1. In a motor vehicle, a front driving axle bearing two wheels, a rear axle bearing a single steering wheel, a lower frame bearing the rear axle, front longitudinal springs (32) having front support on the front axle, and middle and rear connection to the lower frame for resiliently supporting the latter, an upper frame, rear longitudinal springs (41) having rear support on the lower frame, middle connection to one of said frames, and front connection to the upper frame for resiliently supporting the latter, front compression springs (46) between the lower and upper frames for resiliently supporting the latter, a driving motor on the upper frame, and driving connections from the motor to the front axle.

2. In a motor vehicle, an under frame supported upon the wheels, an upper frame, longitudinal springs giving support to the upper frame upon the under frame at one end, and compression springs supporting the other end of the upper frame upon the under frame, with lateral springs preventing undue sway of the upper frame.

3. In a motor vehicle, front and rear axles, and under and upper frames, the front end of the under frame spring supported on the front axle, the rear end of the under frame directly connected to the rear axle, both ends of the upper frame spring supported on the lower frame, a motor carried at the rear end of the upper frame, drive connections from the motor to the front wheels, and a device for steering by the rear wheel or wheels.

4. Vehicle as in claim 3 and wherein the front axle comprises a differential gear through which both front wheels are driven, and the rear axle carries a single rear wheel gimbal-mounted for steering.

In testimony whereof, I have affixed my signature hereto.

JOHN J. GARDNER.